United States Patent [19]
Chmela

[11] Patent Number: 5,170,758
[45] Date of Patent: Dec. 15, 1992

[54] VALVE-CONTROLLED INTERNAL COMBUSTION ENGINE WITH AIR COMPRESSION

[76] Inventor: Franz Chmela, Am Lindenhof 36/21, A-8043 Graz, Austria

[21] Appl. No.: 845,191

[22] Filed: Mar. 3, 1992

[30] Foreign Application Priority Data

Mar. 12, 1991 [AT] Austria ................................ 546/91

[51] Int. Cl.⁵ .............................................. F02F 3/26
[52] U.S. Cl. .................................................. 123/276
[58] Field of Search ............... 123/276, 281, 282, 285, 123/261

[56] References Cited

U.S. PATENT DOCUMENTS

| | | | |
|---|---|---|---|
| 2,882,873 | 4/1959 | Witzky | 123/281 |
| 2,886,024 | 5/1959 | Elias | 123/281 |
| 3,107,658 | 10/1963 | Maurer | 123/276 |
| 3,125,079 | 3/1964 | Hoffmann | 123/276 |
| 3,195,519 | 7/1965 | Bubop et al. | 123/276 |
| 3,244,159 | 4/1966 | Meuser | 123/281 |
| 3,270,721 | 9/1966 | Hidag et al. | 123/276 |
| 3,580,230 | 5/1971 | Hoffman et al. | 123/276 |
| 4,446,830 | 5/1984 | Siunko et al. | 123/276 |
| 4,676,208 | 6/1987 | Moser et al. | 123/276 |
| 4,966,103 | 10/1990 | Schaub et al. | 123/276 |
| 5,103,776 | 4/1992 | Sato | 123/261 |

FOREIGN PATENT DOCUMENTS

| | | | |
|---|---|---|---|
| 2611624 | 6/1982 | Fed. Rep. of Germany | 123/276 |
| 3245780 | 12/1983 | Fed. Rep. of Germany | 123/276 |

*Primary Examiner*—Raymond A. Nelli
*Attorney, Agent, or Firm*—Watson, Cole, Grindle & Watson

[57] ABSTRACT

Valve-controlled internal combustion engine with air compression, for non-self-igniting fuels, comprising an injection nozzle for direct fuel injection into a combustion chamber provided in the piston, and a spark plug, and further comprising devices imparting a torque to the incoming combustion air. To obtain reliable ignition by simple means, the spark plug is positioned in the central area of the combustion chamber and a multi-hole injection nozzle is used.

7 Claims, 2 Drawing Sheets

VALVE-CONTROLLED INTERNAL COMBUSTION ENGINE WITH AIR COMPRESSION

BACKGROUND OF THE INVENTION

The invention relates to a valve-controlled internal combustion engine with air compression for non-self-igniting fuels, comprising a multi-hole injection nozzle for direct fuel injection into a combustion chamber provided in the piston, and a spark plug, and further comprising devices imparting a torque to the incoming combustion air.

DESCRIPTION OF THE PRIOR ART

The key problems in developing such a combustion process are (a) that the air-fuel mixture must be guaranteed to ignite under a variety of environmental and operating conditions, e.g., cold start, no-load operation, operation at rated load, and (b) cost, operational safety and service life of the spark plugs used. In addition, emission levels must be kept as low as possible, and the air available for combustion must be utilized to the full in all combustion engines.

In the internal combustion engine described in U.S. Pat. No. 3,125,079, the injection nozzle is located near the axis of the combustion chamber. In the instance of such a multi-fuel engine this is appropriate: if the engine runs on diesel, the central positioning of the nozzle will offer advantages with regard to smoke emission because of the fact that the fuel jets from the nozzle to the wall of the combustion chamber all have the same length. If the engine operates on alcohol, gasoline or liquid gas, however, smoke emission is of little importance on account of the specific fuel properties.

The combustion process discussed in the German specification DE-PS 32 45 780 C1 meets some of the above requirements, but does not fully satisfy demands regarding the service life of the spark plugs, mixture-formation, utilization of the air charge and emission levels.

In the above combustion process the fuel is deposited on the wall of a rotationally symmetric combustion chamber in the piston by means of a single injection jet, and will then evaporate and burn after having been distributed by a strong swirl generated during the intake phase, the process of combustion being initiated by a spark plug near the wall of the combustion chamber.

In both of the above variants the spark plug is located in an area of intense flow resulting from the inlet torque and the squish generated as the piston top approaches the bottom of the cylinder head.

Because of the intense flow spark is extinguished immediately after discharge and re-ignited several times until the ignited volume of charge is large enough to continue burning. For this purpose a considerable amount of electric energy is required. Besides, the gap of the spark plug must be kept as small as possible to ensure a sufficient length of total discharge time. The maximum permissible gap is 0.4 mm, approximately, if firing failures are to be avoided. In order to maximize service life the spark plugs must be manufactured with a gap of 0.1 mm, which will raise production costs to a degree that series production seems uneconomical.

Another disadvantage of the above combustion process is its single-jet fuel injection, where the nozzle is located near the periphery of the combustion chamber and the fuel jet issuing from the nozzle hits the opposite wall of the combustion chamber in the vicinity of the spark plug, producing a film and thus supplying the spark plug with an explosive mixture. As this film will cover only part of the surface of the wall, it is comparatively thick and will take a relatively long time to evaporate completely, which may lead to protracted combustion and increased emission of unburnt fuel.

In a variant of the above combustion process described in DE-PS 26 11 642 C2 the spark plug is located next to the injection nozzle instead of opposite of it, but again near the wall of the combustion chamber.

SUMMARY OF THE INVENTION

It is an object of the invention to avoid the above disadvantages and to provide an internal combustion engine where reliable ignition is effected by simple means.

This object is achieved by locating the spark plug in the central area of the combustion chamber. This will offer the following advantages:

The spark plug operates in an area of quiet flow and therefore needs less energy for ignition, which will increase its service life. At the same time the gap between the electrodes may be increased to 0.5–1.0 mm as less overall time is required for sparking, which will facilitate manufacture. The reduced distance between the points where the axes of injection nozzle and spark plug pierce the plane of the cylinder head, will permit the distance between the spark gap and the bottom of the cylinder head to be reduced, such that the previously required special spark plugs with their 15 mm straight shell electrodes can be replaced by mass-produced spark plugs with simple hook-shaped electrodes.

Due to the use of a multi-hole injection nozzle, which provides for an increased number of points where the fuel jets hit the wall, and the correspondingly reduced volume of fuel deposited by each individual jet, the thickness of the film deposited on the wall is reduced and mixture formation is improved, which has its positive effects on the emission of unburnt or partially burnt fuel components in the exhaust gas. As the jets are directed transversely to the rotational flow and the squish is traversed by several jets, the ignition delay is reduced, which way be utilized for a retarded initiation of injection and resulting $NO_x$ reduction.

Relocating the spark plug from the wall towards the center of the combustion chamber will of course necessitate a change in the basics of the process, as the explosive mixture at the spark plug can no longer be supplied by the fuel deposited on the wall, as described in the above DE-PS 32 45 789 C1, but must be directly obtained by dispersing the spray cone of a suitably placed injection jet.

For the main phase of combustion following ignition the principle of depositing fuel on the wall of the combustion chamber is maintained as a retarding element in mixture formation, thus enabling a high compression ratio with good efficiency to be obtained in a diesel-operated engine. Practical experience with the combustion process described in the German specification DE-PS 26 11 624 C2 referred to above suggests that the technique of initial mixture-formation as described here for supplying the spark plug from an injection jet is practicable. In the above specification the spark, which for reasons of optimum efficiency usually is due towards the end of the injection phase, had to be advanced with decreasing load parallel to the end of injection, in order to avoid firing failures, if certain conditions were prevailing, i.e., under partial load, in certain jet positions and if a common injection pump was used with constant beginning of injection regardless of the injected volume, i.e. with a variable injection end. As in this invention, the presence of an explosive mixture at the spark gap depended on the injection jet being close by.

In an internal combustion engine of the invention the contours of the combustion chamber in the piston should be such as to permit optimum utilization of the air charge during combustion, by displacing the air locked in the combustion chamber near upper dead center from the central area close to the bottom of the combustion space, which is achieved by providing a conical elevation in this area.

The need for locating the spark plug close to the center of the combustion space is best met by using a cylinder head with four valves. In this instance the spark plug is placed in their center, i.e., where the injection nozzle is situated normally.

Although the position of the injection nozzle resulting from this arrangement necessarily is eccentric to the center of the combustion chamber, this may be tolerated as well as any moderate shift of the combustion chamber relative to the cylinder axis, in view of the spark-ignited fuels used in this instance, whose evaporation properties and tendency towards smoke formation compare favorably to those of conventional diesel fuel.

In cylinder heads with two valves it is more complicated to obtain an optimum position and shape of the injection jet next to the spark plug because of the larger mutual distance between the piercing points of nozzle and spark plug axes. This may be facilitated by using a spark plug with long shell electrodes as mentioned above. The advantages of the invention will regard to lower ignition energy and larger electrode gap still will be maintained.

BRIEF DESCRIPTION OF THE DRAWINGS

Following is a more detailed description of the invention as illustrated by the attached drawings, in which.

DETAILED DESCRIPTION OF THE PREFERRED EMBODIMENTS

Figure 1:
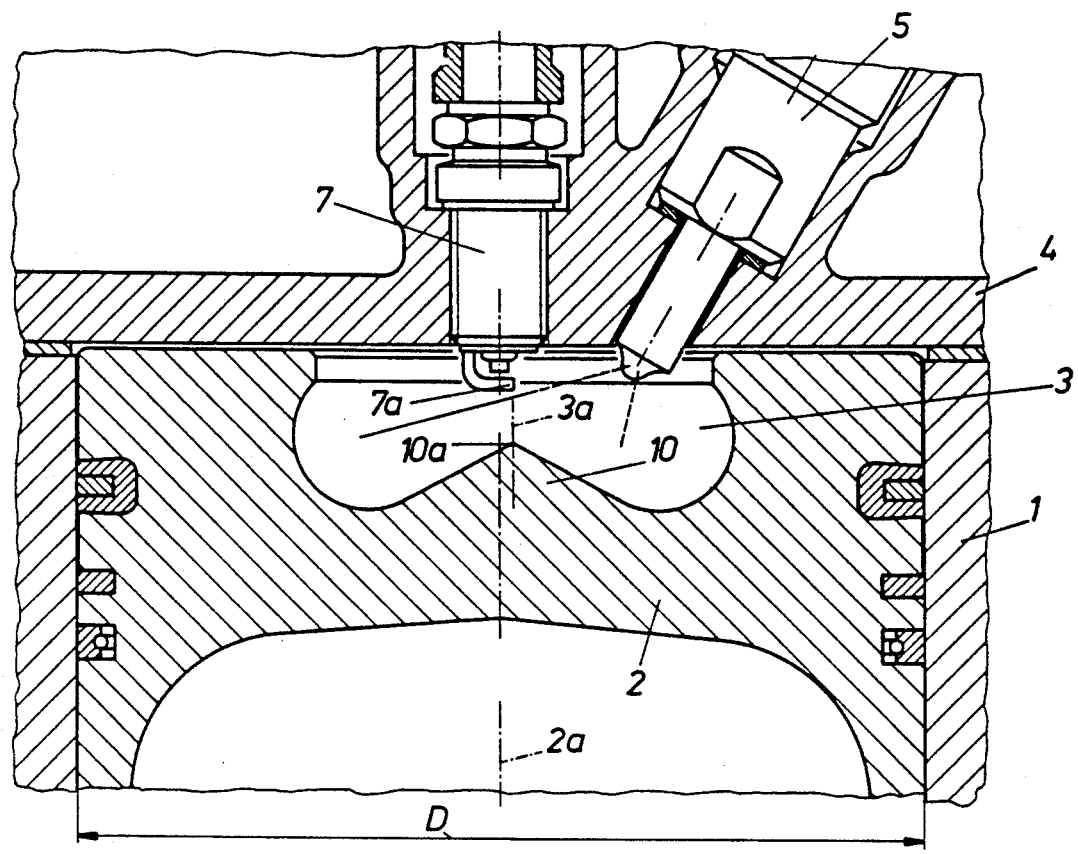
FIG. 1 shows part of a cross-section through the cylinder of an internal combustion engine as specified by the invention, FIG. 2 gives a view from above, and FIG. 3 a view from above of a variant of the invention.
Figure 2:
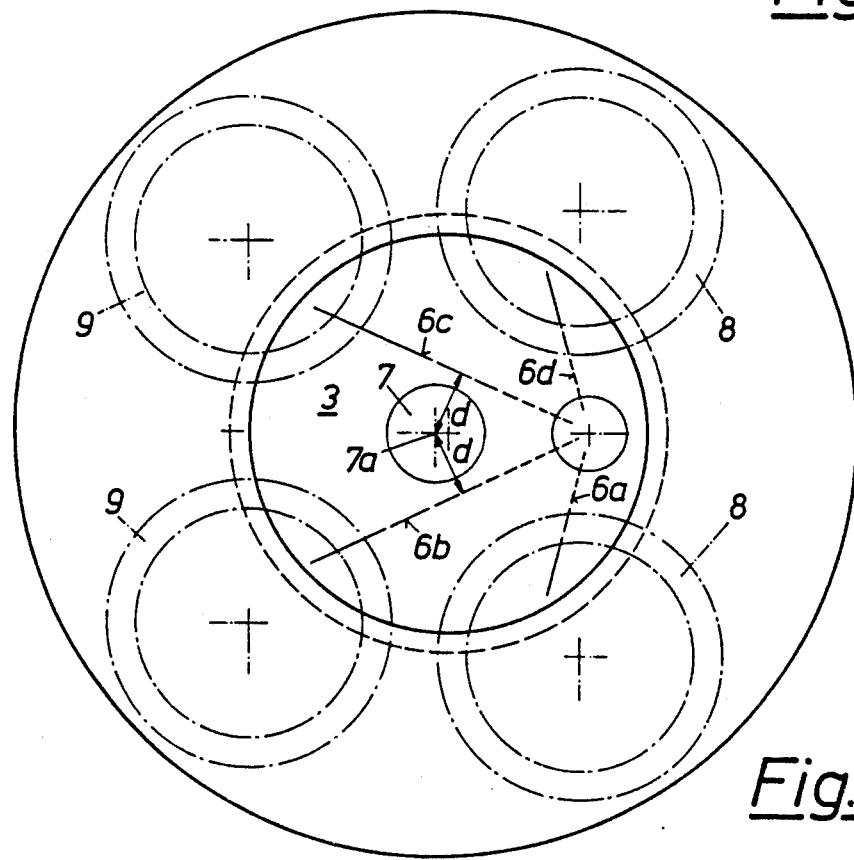

An axially movable piston 2 is located in cylinder 1. In this piston 2, with its diameter D, a rotationally symmetric combustion chamber 3 is provided, whose axis $3a$ is adjacent to the cylinder axis $2a$. In the cylinder head 4 is provided an injection nozzle 5, which in this instance has four injection orifices. In the center of the combustion chamber a spark plug 7 is located. The four axes of the injection orifices, i.e. two on either side of the tip $7a$ of the spark plug 7, have the reference numbers $6a$, $6b$ and $6d$, $6c$ respectively. The three-dimensional distance d of the axes $6b$ and $6c$ of the injection orifices from the tip $7a$ of the spark plug 7 has a length of 1-10 mm, approx. In addition, two intake valves 8 and two exhaust valves 9 are provided in a conventional manner. The highest point $10a$ of the central elevation 10 in the combustion chamber 3 is situated opposite of tip $7a$ of the spark plug 7.

Furthermore, conventional devices are provided for generating a torque, such as suitably shaped intake passages, which are not shown in this drawing.

Figure 3:
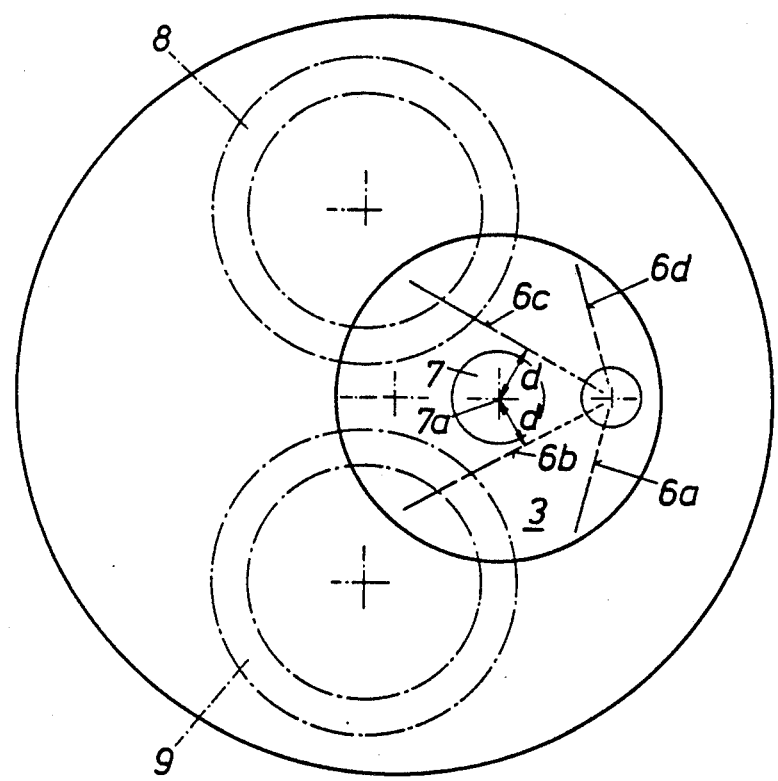

In the variant of FIG. 3 the spark plug 7 is located as closely as possible to the two valves 8 and 9. The combustion chamber 3 with the spark plug at its center, is eccentric to the piston axis in this case.

I claim:

1. A valve-controlled internal combustion engine with air compression for non-self-igniting fuels, comprising a piston, a spark plug having a tip, and an injection nozzle with injection orifices for direct fuel injection into a combustion chamber provided in said piston and further comprising devices imparting a torque to the incoming combustion air, wherein a spark plug is located in a central area of said combustion chamber.

2. An internal combustion engine according to claim 1, wherein said combustion chamber is rotationally symmetric, and is provided with a central elevation having a highest point, and wherein said spark plug is located essentially opposite of said highest point of said elevation of said piston.

3. An internal combustion engine according to claim 2, wherein at least one of said injection orifices is directed upon an area around said spark plug.

4. An internal combustion engine according to claim 3, wherein the shortest distance of the axis of at least one of said injection orifices from said tip of said spark plug is about 1 to 10 mm.

5. An internal combustion engine according to claim 1, wherein four valves are provided for each cylinder.

6. An internal combustion engine according to claim 4, wherein four valves are provided for each cylinder.

7. An internal combustion engine according to claim 1, wherein two valves are provided four each cylinder, and wherein the axis of said combustion chamber is situated near said tip of said spark plug, which is preferably positioned such that its axis coincides with the piston axis.

* * * * *

UNITED STATES PATENT AND TRADEMARK OFFICE
CERTIFICATE OF CORRECTION

PATENT NO.   :   5,170,758
DATED        :   December 15, 1992
INVENTOR(S)  :   Franz CHMELA It is certified that error appears in the above-identified patent and that said Letters Patent is hereby corrected as shown below:

On the title page, insert:

[73]  Assignee:  AVL Gesellschaft für
                 Verbrennungskraftmaschinen und
                 Messtechnik M.B.H. Prof.Dr.Dr. h.c.
                 Hans List, Graz, AUSTRIA Signed and Sealed this Twelfth Day of October, 1993

Attest:

BRUCE LEHMAN

Attesting Officer        Commissioner of Patents and Trademarks